United States Patent [19]

Searcy et al.

[11] 3,803,000
[45] Apr. 9, 1974

[54] INHIBITION OF ANTI-BACTERIAL ACTION OF BLOOD

[75] Inventors: Ronald L. Searcy; Frank E. Kocka, both of Des Plaines, Ill.

[73] Assignee: G. D. Searle & Co., Chicago, Ill.

[22] Filed: Feb. 14, 1972

[21] Appl. No.: 226,247

[52] U.S. Cl.................... 195/100, 195/99, 195/101, 195/102, 195/103
[51] Int. Cl............................................. C12k 1/10
[58] Field of Search .......... 99/21; 195/99, 100, 101, 195/102, 103, 1.7, 1.8

[56] References Cited
UNITED STATES PATENTS
3,271,388  9/1966  Cammarata et al............ 260/233.5

*Primary Examiner*—A. Louis Monacell
*Assistant Examiner*—Robert J. Warden
*Attorney, Agent, or Firm*—Elliot N. Schubert

[57] ABSTRACT

The present invention relates to a novel use of sulfates of the amylopectin fraction of starch, in which these compounds are added to blood samples in order to act both as anticoagulants and also to enhance the recovery and identification of bacteria and mycoplasma in these samples.

6 Claims, No Drawings

INHIBITION OF ANTI-BACTERIAL ACTION OF BLOOD

There are several factors in blood which have antibacterial activity, and these factors interfere with the isolation and detection of bacteria in blood samples. It is therefore an advantage to be able to inhibit the antibacterial activity of the blood without affecting the bacteria which are required for analysis.

There are several factors in blood which are known to have antibacterial activity. Lysozyme is a protein which is active primarily against gram-positive bacteria, as is β-lysin, both these inhibitors being heat stable. The antibody-complement system of the body is active against gram negative organisms and is heat labile. These factors together provide considerable antibacterial activity in blood.

It has become increasingly clear in recent years that certain mycoplasma species are pathogenic to humans, more particularly *Mycoplasma hominis* and *Mycoplasma pneumoniae*. However, there are considerable difficulties in isolating and identifying these organisms in blood samples, due partly to the activity of the antibacterial systems in the blood containing them. A very important advantage of the present invention is, therefore, that the sulfates of amylopectin from potato starch are also active in increasing the recovery and isolation of mycoplasma present in clinical samples.

More particularly, the compounds of the present invention are the water-soluble salts of sulfates of the amylopectin fraction from potato starch and are described in U.S. Pat. No. 3,271,388. These salts can be prepared as aqueous solutions and a further advantage is that they are sufficiently stable to withstand autoclaving. Consequently they can be added to vessels, culture media etc., prior to sterilization by autoclaving. This is of particular use when the compounds are desired to be incorporated into blood collection vessels or culture media.

The amylopectin sulfates combine the properties of increasing the recovery of mycoplasma and bacteria, with an anticoagulant activity. The latter property is shared by heparin and the compound sodium polyanethol sulfonate (SPS), and maybe a property common to many sulfated polysaccharides. In addition, SPS increases the survival of bacteria in blood samples, but inhibits the growth and isolation of mycoplasma (Evans et al., 1967). The amylopectin sulfates of the present invention are therefore seen to have the advantage of both acting as anticoagulants and enhancing the recovery of bacteria from blood samples and also enhancing the recovery of mycoplasma.

The amylopectin sulfate salt, for example, sodium amylosulfate (SAS), can be added to freshly collected blood, to a broth culture medium inoculated with serum or blood sample or to a solid culture medium containing blood or serum. It is preferable that SAS should be added to blood soon after collection to prevent a serious reduction in the retrieval of bacteria and mycoplasma from the sample. As SAS also displays anti-coagulant activity, it is ideally added to the collection vessel such that the collected blood is mixed directly with the compound. A sample of the blood/SAS mixture can then be added to a suitable culture medium, such as trypticase soy broth, and incubated for a period of time. The growth of bacteria can then be identified and measured by spreading samples from the growth medium onto a solid growth medium, and counting the growing colonies.

Alternatively, the growth of mycoplasma can be measured by inoculating Hayflick's broth medium with a clinical specimen, incubating the broth at 37°C. for a suitable period, and plating the mycoplasma growth on Hayflick's agar medium. In this case SAS is added to the Hayflick's broth agar media, which contains horse serum, in addition to adding it to the clinical specimen itself. Similarly, the presence of mycoplasma in throat cultures can be determined by inoculating Hayflick's broth containing SAS with these cultures, and subsequently plating the Hayflick's broth onto Hayflick's agar medium. In general, the addition of suitable concentrations of SAS to any sample or culture medium containing blood or serum, will enahance the recovery of bacteria or mycoplasma from the sample or medium.

The nature of the present invention is illustrated more fully in the following examples. These examples are not intended to limit the invention and modification in materials and methods will be apparent to those skilled in the art.

EXAMPLE 1

The antibacterial effect of serum, and its inhibition with SAS, is illustrated in the following example. In order to measure quantitatively the effect of SAS, known amounts of individual strains of bacteria were added to serum samples.

To fresh serum, was added about $10^5$ organisms per ml. The organisms studied were the following: *Escherichia coli, Salmonella oranienburg, Streptococcus fecalis, Streptococcus pyogenes, Diplococcus pneumoniae, Micrococcus lysodeikticus, Pseudomonas aeruginosa, Staphylococcus aureus*. SAS, in a final concentration of 0.05 percent (w/v), was added to some samples, and some further serum samples were heated to 56°C. for 30 minutes before use.

After incubation in the presence or absence of serum, the bacteria cultures were counted by plating onto Trypticase Soy Agar (TSA; Baltimore Biological Laboratories, Baltimore, Md.)

The following organisms, *E. coli, S. oranienburg* and *M. lysodeikticus* failed to grow in the presence of 25 percent serum (v/v) (Table 1). The inhibitory effect of serum on the growth of *E. coli* and *S. oranienburg* was inactivated by heating the serum to 56°C. for 30 minutes, but this did not alter the effect of serum on the growth of *M. lysodeikticus*. In contrast, the inhibitory effect of serum on all three organisms above are prevented by the presence of 0.05 percent (w/v) SAS.

The rate at which *E. coli* are killed by fresh serum is shown in Table 2. *E. coli* were left in the presence of serum for periods of time up to 90 minutes and were then counted by plating onto TSA. The presence of 50 percent (v/v) serum killed all the *E. coli* within 10 minutes and this effect was prevented by the presence of 0.05 percent (w/v) SAS. The presence of 25 percent (v/v) serum reduced the bacteria count after 10 minutes contact and by 30 minutes, all bacteria were killed. Addition of SAS to a concentration of 0.05 percent, or the prior heating of the serum to 56°C. for 30 minutes, allowed normal, uninhibited growth of the bacteria.

This example demonstrates, therefore, the powerful antibacterial activity of serum and the ability of SAS to overcome this activity.

EXAMPLE 2

The ability of SAS to potentiate the growth of mycoplasma, in the presence of blood, is demonstrated in the following example. Individual strains of mycoplasma were tested for their ability to grow in three different situations.

The effect of SAS on the isolation of mycoplasma was tested using the following strain of mycoplasma:

M. homonis I
M. homonis II
M. fermentens
M. orale I
M. orale II
M. orale III
M. salivarium
M. pneumoniae (M52)
M. pneumoniae (FH)
M. laidlawii B
M. pulmonis
M. neuroliticium The ability of SAS to affect the growth of these mycoplasma was tested by (1) the effect of this impregnated with various concentrations of SAS on the growth of mycoplasma on agar plates, (2), the effect of various concentrations of SAS on the growth of mycoplasma in Hayflick's broth and (3) the effect of various concentrations of SAS in Hayflick's agar medium on the growth of mycoplasma.

1. Plates of Hayflick's agar were spread with stock cultures of mycoplasma, and were allowed to dry. Paper discs (¼ inch diameter) were impregnated with 0.02 ml. of solution of SAS ranging from 0.01 to 5 percent. The discs were placed on marked positions on the plate, and the plates were incubated under suitable conditions for 48 hours.

Concentrations of SAS between 0.01 to 5 percent caused no inhibition of mycoplasma growth, and this was true of all strains of mycoplasma tested.

2. Tubes of Hayflick's broth containing 0.01 percent, 0.05 percent or 0.1 percent SAS were inoculated with standard broth cultures of mycoplasma either undiluted or diluted $10^4$ times. The tubes were incubated for a suitable period of time, between 2 and 5 days, and the broth cultures plated onto Hayflick's agar complete. Following incubation of the plates, the viable colonies were counted.

At the $10^4$ dilution, two strains of M. pneumoniae showed some inhibition in the 0.1 percent concentration of SAS. Otherwise, SAS did not inhibit the growth of mycoplasma in the broth culture.

3. Plates of Hayflick's agar were prepared containing between 0.001 to 0.1 percent SAS. The plates were inoculated with 0.1 ml. of stock broth cultures of mycoplasma, and incubated for a suitable time. The number of colonies formed was then counted.

Only the growth of M. fermentens was inhibited significantly by SAS, in the agar plate. This was most apparent when SAS was present at a concentration of 0.1 percent.

The results of the present example demonstrate clearly that in general SAS has no inhibitory effect on the growth of mycoplasma in broth cultures or on agar media.

EXAMPLE 3

The isolation of mycoplasma from throat cultures was tested using Hayflick's agar media, with and without SAS, and also using Hayflick's broth with SAS.

For isolation on the agar media, throat swabs were routinely plated on the agar. The plates were incubated under suitable conditions for a given period of time, and the number of viable colonies counted.

For isolation in the Hayflick's broth, the tip of the throat swab was broken off and allowed to remain in the broth. The broth culture was incubated for four or more days, and then 0.2 ml. was spread on plates of Hayflick's agar media. The agar plates were then incubated under similar conditions and the number of viable colonies was counted.

The throat cultures made on Hayflick's agar media showed 18 positive cultures. Those grown in the presence of SAS were 35 percent larger in size and grew out faster than the cultures on the control Hayflick's media. Throat swabs cultured in Hayflick's broth with SAS added showed 67 positive cultures.

It was clear then, that SAS, increased the recovery and growth rate of mycoplasma cultures, and was particularly advantageous in Hayflick's broth cultures.

TABLE I

A representative Determination of the Number of Organisms to Initiate Growth After Incubation in Whole Blood

| Organisms added[1] | $1.4\times10^7$ | $1.4\times10^6$ | $1.4\times10^5$ | $1.4\times10^4$ | $1.4\times10^3$ | $1.4\times10^2$ | 14 | 1.4 | 0 |
|---|---|---|---|---|---|---|---|---|---|
| SAS-treated blood | +[2] | + | + | + | + | + | + | + | — |
| Untreated blood 0. | + | + | + | — | — | — | — | — | — |

[1]Organism used was *Escherichia coli*. Plate count on Trypticase Soy agar. Results in organisms per ml.
[2]+ refers to growth in Trypticase Soy Broth after overnight incubation at 37°; — refers to no growth

TABLE II

The Activity of Two Sera Against *Escherichia coli*

| | Initial inoculum $4.6 \times 10^5$ organism/ml | | | Initial inoculum $3.2 \times 10^5$ organism/ml | | | |
|---|---|---|---|---|---|---|---|
| Exposure to Serum (min.) | No Serum | 50% Serum | 50% Serum 0.05% SAS[1] | No Serum | 25% Serum | 25% Serum[2] | 25% Serum 0.05% SAS[1] |
| 10 | [3]$4.6 \times 10^5$ | 0 | $3.9 \times 10^5$ | $3.2 \times 10^5$ | $11.8 \times 10^4$ | $3.5 \times 10^5$ | $3.7 \times 10^5$ |
| 30 | $4.8 \times 10^5$ | 0 | $5.3 \times 10^5$ | $6.1 \times 10^5$ | 0 | $5.3 \times 10^5$ | $6.0 \times 10^5$ |
| 90 | $13.0 \times 10^5$ | 0 | $11.6 \times 10^5$ | $12.0 \times 10^5$ | 0 | $12.7 \times 10^5$ | $11.7 \times 10^5$ |

[1] SAS refers to sodium amylosulfate.
[2] Serum was heat inactivated at 56° for 30 min.
[3] Values represent organisms per ml.

What is claimed is:

1. A method of reducing the antibacterial and antimycoplasmal activity of blood which comprises incorporating soluble salts of amylopectin sulfates prepared from potato starch in a culture medium which contains blood or fractions of blood or by first adding said soluble salts to the blood or blood fractions, then incorporating that mixture in said medium.

2. A method as claimed in claim 1 in which said amylopectin sulfate salts are present at a final concentration between 0.01 and 5 percent (w/v).

3. A method as claimed in claim 2 in which the said salts are the sodium and potassium salts of amylopectin sulfates.

4. A method as claimed in claim 3 in which said soluble salts of amylopectin sulfates are added to a vessel suitable for collecting freshly drawn blood and the vessel and salt solution are autoclaved.

5. A method as claimed in claim 3 in which a solution of said amylopectin sulfate salts is added to media suitable for the culture of bacteria or mysoplasma, and which contains blood as serum.

6. A method as claimed in claim 5 in which the culture media are Hayflick's broth medium or Hayflick's agar medium.

* * * * *